Jan. 16, 1951  A. KOST  2,538,368
SEGMENTAL MOLD FOR GEAR WHEELS
Filed Sept. 2, 1947  2 Sheets-Sheet 2
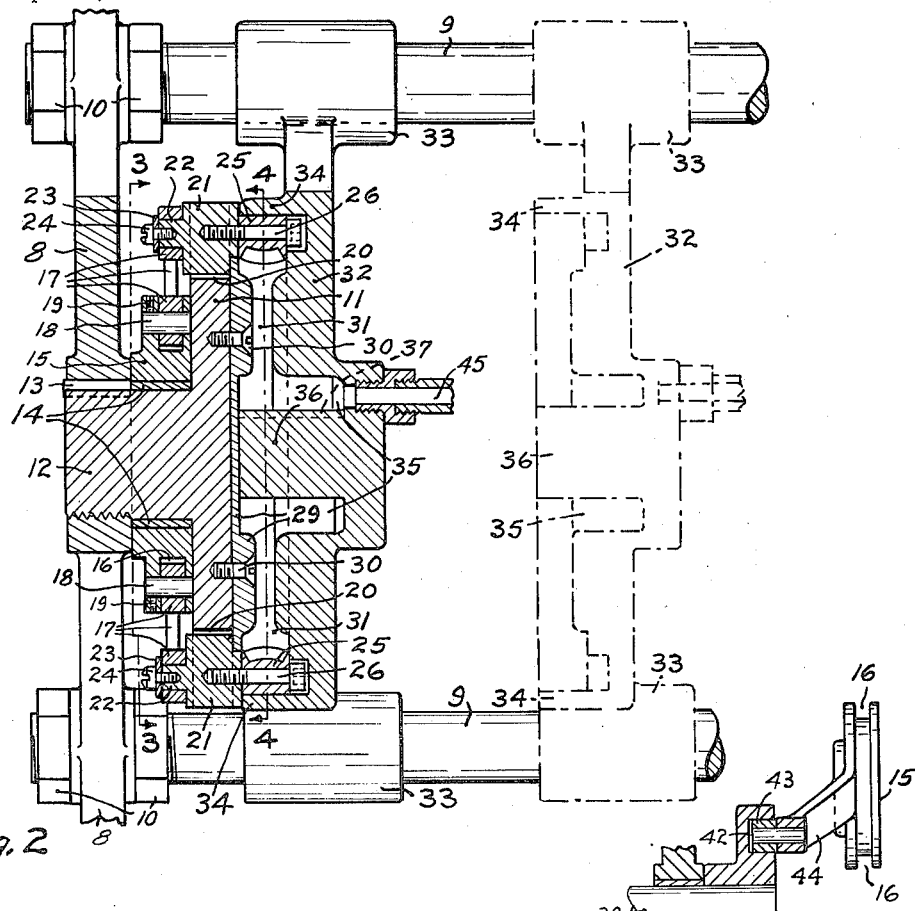
Fig. 2
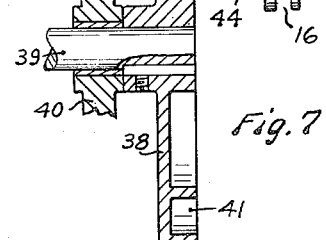
Fig. 7
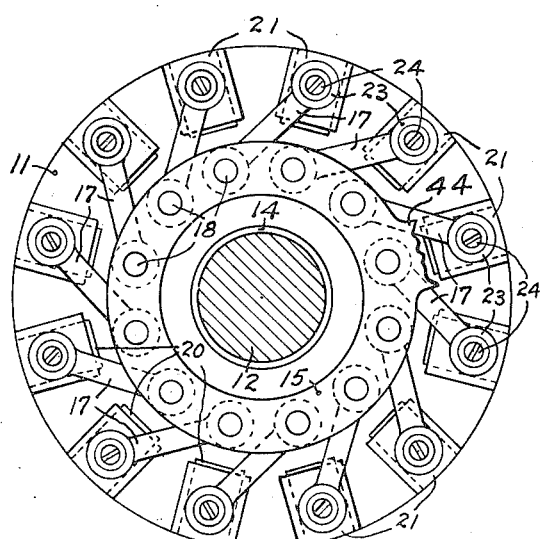
Fig. 3
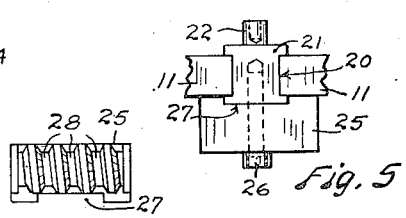
Fig. 6
Fig. 5
INVENTOR
Alwin Kost
BY
Fred C. Matheny
ATTORNEY Patented Jan. 16, 1951

2,538,368

UNITED STATES PATENT OFFICE 2,538,368

SEGMENTAL MOLD FOR GEAR WHEELS

Alwin Kost, Portland, Oreg.

Application September 2, 1947, Serial No. 771,826

3 Claims. (Cl. 22—138)

This invention relates to die-casting or molding means of a type particularly adapted for use in casting gearwheels.

An object of this invention is to provide die-casting or molding means that is adapted for use in casting gearwheels having peripheral teeth disposed at other than right angles to the plane of the gearwheel.

Another object is to provide die-casting or molding means by which gearwheels may be made with sufficient accuracy so that the teeth and surfaces which normally have to be machined will require very little machine finishing, the only machine work needed being to ream the hub opening and make one or two light cuts on the teeth to polish the surfaces thereof.

Another object is to provide die-casting means that is particularly adapted for the casting of worm gears, helical gears, spiral gears, herringbone gears and other gears in which the teeth are shaped so that it is not possible to withdraw a mold part sidewise from the gear after the gear is cast.

A further object is to provide die-casting means for casting a cylindrical object, said die-casting means having a peripheral portion formed of a plurality of segments which are radially movable outwardly to withdraw said segments from an object after it has been cast.

Other objects of the invention will be apparent from the following description taken in connection with the accompanying drawings.

In the drawings:

Fig. 2 is a diametrical sectional view of said die-casting means taken substantially on broken line 2—2 of Fig. 1, but showing all parts of the die or mold in a closed position as they would be preparatory to the introduction of molten metal into the die or mold, a retracted position of one side portion of the mold being shown by dot and dash lines.

Fig. 3 is a sectional view with parts in elevation taken substantially on broken line 3—3 of Fig. 2.

Fig. 4 is a sectional view, with parts in elevation, taken substantially on broken line 4—4 of Fig. 2.

Fig. 5 is an edge view of one of the peripheral mold segments and a block connected therewith together with a fragment of a disc by which these parts are carried.

Fig. 6 is a plan view showing the toothed side of one of the peripheral segments of the mold.

Fig. 7 is a fragmentary view partly in section and partly in elevation showing detached parts of the means used for moving the peripheral segments of the mold inwardly and outwardly.

Like reference numerals designate like parts throughout the several views.

Figure 1:
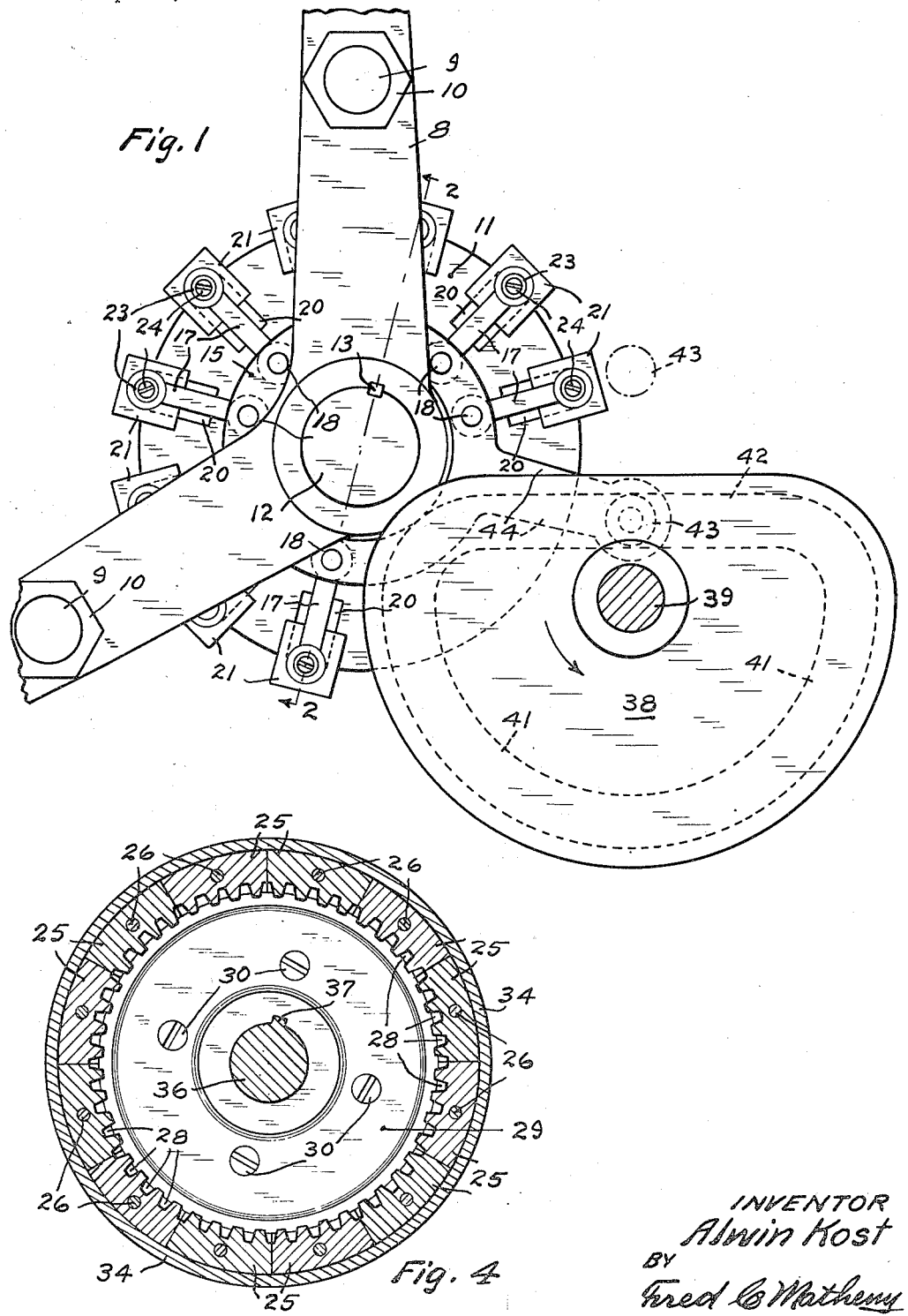
Figure 1 is an end view of die-casting means constructed in accordance with this invention showing the same with the peripheral mold sections thereof moved outwardly as they would be when in a position to release a casting.

This die-casting or permanent mold casting device comprises any suitable supporting frame means, such as the frame 18, having one or more guide rods 9 secured thereto by nuts 10. Obviously the structure of this frame can be widely varied as said frame serves only to support the essential parts of the mold or die-casting device.

The die-casting mold proper comprises a disc shaped member 11 having an integral hub portion 12 that is fixedly and non-rotatively secured, as by a key 13, to the frame member 8. A bearing member 14 on the hub 12 between the disc 11 and frame 8 has a collar 15 mounted thereon for limited rotative movement. The collar 15 has an annular peripheral grove 16 for the reception of the inner end portions of a plurality of outwardly extending links 17. A pin 18 pivotally connects the inner end of each link 17 with the collar 15 and a screw 19 locks each pin 18 in place.

The peripheral portion of the disc 11 is provided with a plurality of equidistantly spaced radial notches 20 for the reception of a plurality of mounting blocks 21. Each mounting block 21, see Fig. 5, is grooved on two opposite sides so that it will slidably fit within one of the notches 20 and will lap over the adjacent edge portions of the disc 11 and will be firmly supported and guided for radial movement by the disc 11.

Each mounting block 21 is further provided with an integral bearing stud 22 with which the upper end portion of one of the links 17 is pivotally connected. A washer 23 and screw 24 can be used to secure each link 17 to the bearing stud 22 with which it is connected.

Each mounting block 21 has a toothed mold segment 25 fixedly secured thereto as by a cap screw 26. Preferably each mold segment has a relatively wide groove 27 on one side thereof which fits over and receives the adjacent side portion of the mounting block 21 with which it is connected so that the mounting block and segment are fixedly and immovably connected with each other. The sides of each segment 25 are plane and flat and are disposed in radial planes relative to the axis of the mold. The inner surface of each segment 25 is provided with recesses or cavities 28 which are suitably shaped to form teeth of any desired configuration on the periphery of a gearwheel that is cast in the mold. The only limitation as respects the shape of the recesses or cavities 28 is they be shaped so that the segments 25 can be retracted radially from a gear after the gear is cast. Thus a mold is provided which makes it possible and practical to cast any gear or gearwheel having teeth that extend at an oblique angle to the plane of the gear so that worm gears, helical gears, spiral gears, herringbone gears and the like can be cast. If the walls of the recesses or cavities 28 are made with precision and are smoothly finished then the teeth of a gearwheel, such as a worm or helical or spiral gearwheel can be very accurately made so that very little machine work will be required to properly finish the gear after it has been removed from the mold, thus saving in cost of production.

A face member 29 is secured as by screws 30 to the side of the disc member 11 toward the mold cavity 31. This face member 29 is shaped so as to form a side wall of any desired configuration of a gearwheel that is cast in the mold. This face member 29 can be quickly and easily removed and replaced by one of different configuration to facilitate casting different gearwheels in the same mold or die-casting machine. Also the segments 25 can be removed and replaced by others having tooth cavities of different shape therein in the interest of using the same machine to cast different types of gearwheels.

The side wall of the mold cavity 31 opposite to the face plate 29 is formed by a movable side member 32. The member 32 has bearing portions 33 that are guided for sliding movement on the fixed frame rods 9. An annular integral flange 34 is provided on the inner side of the movable side member 32. This flange 34 is adapted to fit over and encircle the toothed mold segments 25 to hold the same in a closed position. The flange 34 fits over the mold segments 25, as above described, when the mold segments 25 are in a contracted or closed position and the side member 32 is moved as far as possible toward the disc member 11, see Figs. 2 and 4.

The inner face of the movable member 32 is shaped so as to form a side wall of any desired configuration on a gearwheel and can be a separate piece similar to the face member 29 of disc member 11. Preferably said member 32 is shaped to provide a cavity 35 for forming the hub portion of a gear. Also preferably said member 32 has an inwardly protruding integral stud 36 to provide an axial passageway in the hub of a gearwheel that is cast therein. A rib 37 can be provided on the stud 36 to form a keyway within the axial hub passageway of the gearwheel.

Inlet means 45 are provided in connection with the movable mold member 32 through which molten metal can be introduced under any desired pressure. If necessary this inlet may be through the hub 12.

Any desired means can be provided for retracting the movable member 32 or for relatively separating or moving apart said member 32 and the disc 11 and parts carried thereby. Also any desired means can be provided for locking or securing these two parts together in a proper position for casting.

Obviously rotary movement of the collar 15 relative to the disc 11 will act through the links 17 to simultaneously move all of the mounting blocks 21 and segments 25 either inwardly or outwardly in radial directions. One means that can be used to rotatively move the collar 15 and thereby radially move the mounting blocks 21 and segments 25 comprises a cam member 38 secured to a shaft 39 that is rotatively mounted in bearing means 40. The cam member 38 has a cam slot comprising an arcuate portion 41 and a flattened portion 42. The arcuate portion 41 is concentric to the axis of rotation of said cam member. A roller 43 on the outer end portion of a lever arm 44 is operatively disposed in the cam slot 41, 42. The lever arm 44 is integral with, or rigidly secured to, the collar 15. If cam member 38 is rotated in the direction indicated by the arrow in Fig. 1 then said cam member 38 will move the mounting blocks 21 and mold segments 25 outwardly when the roller 43 is in the left half of the flattened portion 42 of the slot as respects the showing in Fig. 1 and will retract or move these parts 21 and 25 inwardly when the roller 43 is in the right half of the flattened portion 42 of said slot. When the roller 43 is in the arcuate portion 41 of the cam slot it will be in the position shown by dot and dash lines in Fig. 1. When in this position there is no motion to arm 44 and segments 25 remain in closed position. The cam 38 is revolving constantly and the arcuate portion allows time for the movement of the die member 32 and the casting operation. The cam member 38 can be rotated either manually or by power operated means and movement of the movable side member 32 can be synchronized with the movement of the segments 25.

To prepare this mold for casting a gearwheel the segments 25 are moved inwardly and the side member 32 is moved as far as possible toward these segments 25, as shown in Fig. 2. In this position the flange 34 fits over and encircles the segments 25 and all of said segments are firmly bound together in a true circle. Molten metal is then injected under any desired pressure through the inlet means 45 and allowed enough time to harden and solidify. The side member 32 is then moved outwardly, see dot and dash lines Fig. 2, far enough so that the flange 34 is clear of the segments 25 and is out of the way as respects removal of the casting. The segments 25 can then be moved outwardly to release the casting and allow it to drop out of or be removed from the mold.

In this way the gearwheels can be cast rapidly and can be very accurately made so that only a small amount of machine work is required to finish said gearwheels. This greatly reduces the cost of production of gearwheels of types having teeth from which it is not possible to withdraw a mold part by sidewise movement.

The foregoing description and accompanying drawings clearly disclose a preferred embodiment of my invention but it will be understood that changes in the invention can be made within the scope and spirit of the following claims.

I claim:

1. Die-casting means comprising a disc member adapted to form one side wall of a mold cavity; said disc member having a plurality of radial notches provided in equi-distantly spaced relation in the peripheral portion thereof, said notches having parallel side walls; mounting blocks supported and guided for radial movement in said notches; means operable to radially move all of said mounting blocks; a mold segment carried by each mounting block and extending sidewise therefrom, the sides of said mold segments being radial as respects said disc member whereby when all of said mold segments are moved inwardly into side by side abutting relation they will cooperate to form a cylindrical wall of a mold cavity; a plate supported by said guide means for movement toward and away from said disc member, said plate being adapted to form the other side wall of a mold cavity; and a circular flange carried by said plate positioned to encircle and support all of said segments when said segments are moved inwardly into side by side abutting relation to form the circumferential wall of the mold cavity and cooperating to provide a leak tight mold for the reception of molten metal under pressure.

2. Die-casting means comprising a disc member adapted to form one side wall of a mold cavity; said disc member having radial notches provided in equi-distantly spaced relation in the peripheral portion thereof, said notches having parallel side walls; mounting blocks supported in said notches and guided therein for radial movement; a sleeve rotatively mounted on said disc; link means pivotally connecting each mounting block with said sleeve, whereby rotary movement of the sleeve will radially move all of said mounting blocks; means for rotatively moving said sleeve; a mold segment carried by each mounting block and extending sidewise therefrom, the sides of said mold segments being radial as respects said disc whereby when all of said mold segments are moved inwardly into side by side abutting relation they will cooperate to form a cylindrical wall of a mold cavity; a plate supported for movement toward and away from said disc member, said plate being adapted to form the other side wall of a mold cavity; and a circular flange carried by said plate positioned to encircle and support all of said segments when said segments are moved inwardly into side by side abutting relation to form the circumferential wall of the mold cavity and cooperating to provide a leak tight mold for the reception of molten metal under pressure.

3. Die-casting means comprising a rigid frame; a disc member adapted to form one side wall of a mold cavity; a rigid hub on said disc member secured to said frame supporting said disc member in spaced relation from said frame; radial notches provided in equi-distantly spaced relation in the peripheral portion of said disc member, said notches having parallel side walls; a plurality of mounting blocks supported in said notches and guided therein for radial movement; a sleeve rotatively mounted on said hub between said frame and said disc member; a link pivotally connected with each mounting block, the inner end of each link being pivotally connected with said sleeve, whereby rotary movement of the sleeve will radially move all of said mounting blocks; lever means connected with said sleeve for rotatively moving the same; a mold segment carried by each mounting block and extending sidewise therefrom, the sides of said mold segments being radial as respects said disc member whereby when all of said mold segments are moved inwardly into side by side abutting relation they will cooperate to form a cylindrical wall of a mold cavity; guide means supported by said frame; a disc shaped plate supported by said guide means for movement toward and away from said disc member; said plate being adapted to form the other side wall of a mold cavity; molten metal inlet means carried by said plate; and a circular flange carried by said plate positioned to encircle and support all of said segments when said segments are moved inwardly into side by side abutting relation and cooperating to provide a leak tight mold for the reception of molten metal under pressure.

ALWIN KOST.

REFERENCES CITED

The following references are of record in the file of this patent:

UNITED STATES PATENTS

| Number | Name | Date |
| --- | --- | --- |
| 500,591 | Maxwell | July 4, 1893 |
| 1,443,341 | Brown | Jan. 30, 1923 |
| 1,569,851 | Bushnell | Jan. 19, 1926 |
| 1,669,532 | Myers | May 15, 1928 |
| 1,967,796 | Weiss | July 24, 1934 |

OTHER REFERENCES

"Die Casting for Engineers," by the New Jersey Zinc Co., page 42.